United States Patent [19]
Larsen

[11] Patent Number: 6,031,443
[45] Date of Patent: Feb. 29, 2000

[54] MAGNETIC COIL WITH STEPPED WINDING

[75] Inventor: Hartmut Larsen, De Haan, Belgium

[73] Assignee: Siemens Aktiengesellschaft, Munich, Germany

[21] Appl. No.: 08/939,153

[22] Filed: Sep. 29, 1997

[30] Foreign Application Priority Data

Sep. 30, 1996 [DE] Germany ............... 196 40 257

[51] Int. Cl.$^7$ ............... H01F 27/30; H01F 27/29
[52] U.S. Cl. ............... 336/192; 336/198; 336/208
[58] Field of Search ............... 336/185, 192, 336/198, 208; 242/139, 613.1, 41.9

[56] References Cited

U.S. PATENT DOCUMENTS

| | | | |
|---|---|---|---|
| 2,438,985 | 4/1948 | Ambrose | 175/341 |
| 4,639,706 | 1/1987 | Shimizu | 336/170 |
| 4,988,055 | 1/1991 | Sakai et al. | 242/159 |

FOREIGN PATENT DOCUMENTS

| | | |
|---|---|---|
| 34 32 812 | 4/1989 | Germany . |
| 295 14 315 U | 12/1995 | Germany . |
| 6-112057 | 4/1994 | Japan . |
| 304 063 | 9/1968 | Sweden . |

OTHER PUBLICATIONS

Abstract of Japanese Application 2–110905, *Patent Abstracts of Japan*, vol. 14, No. 328, E–952, Jul. 13, 1990.

*Primary Examiner*—Michael L. Gellner
*Assistant Examiner*—Anh Mai
*Attorney, Agent, or Firm*—Hill & Simpson

[57] ABSTRACT

A coil bobbin for a magnetic coil has a transition between two winding levels, which is provided with a plastic, radially-extending web that extends into the winding space, and the web is provided with a passage for the winding wire to move between the higher and lower levels.

3 Claims, 1 Drawing Sheet

MAGNETIC COIL WITH STEPPED WINDING

BACKGROUND OF THE INVENTION

The present invention is directed to a magnetic coil with an essentially hollow-cylindrical coil body or bobbin composed of an insulating material that is provided with two terminal pins anchored in an end region of the coil bobbin, which bobbin has a cylindrical core forming a winding space comprising two different radii adjoining one another in an axial direction.

German 29 514 315 U1 discloses a magnetic coil bobbin having cylindrical cores of two different diameters adjoining one another in an axial direction. However, this does not propose the step-shaped transition between the winding cores, but only an oblique transition with a slope of around 30°. The coil therein, moreover, is provided for winding upon the lower to the higher level, since the winding wire would otherwise slip off.

These coils are especially suited for utilization in the automotive field, for example, as valve coils for ABS systems, whereby a lacquered winding wire that resists various stresses is often employed for such applications, which include being electrically and mechanically connected to the coil-side end regions of the terminal elements. It is standard to hermetically encapsulate the finished winding by a plastic extrusion coating technique.

There is a desire, in some applications, to fashion the coil body with cores, which form the core of the winding space, with, in particular, two winding levels offset in a radial direction. For example, the device parts arranged in the inside of the hollow-cylindrical core of the coil body can be a reason for this offset. For example, the device part has a greater radial expanse in the upper region of the hollow cylindrical core than in the lower region. In order to save winding space toward the outside and, thus, keep the exterior dimensions of the magnet core optimally small toward the outside, it is then necessary to exploit, for example, the space becoming free toward the inside in the lower region with the winding level that is radially inwardly offset in this lower section. Such a fashioning of the winding space, however, is problematic, particularly in view of the standard, fully-automatic winding procedure.

SUMMARY OF THE INVENTION

The object of the present invention is to create a magnetic core bobbin having cylindrical core portions of different diameters which can be fully automatically wound when the winding is started on a higher winding core.

This object is accomplished by an improvement in a coil bobbin which has essentially a hollow-cylindrical coil bobbin composed of an insulating material that is provided with two terminal pins anchored in an end region of the coil bobbin and projecting therefrom and in that the coil bobbin has cylindrical winding cores forming the floor of the winding space comprising different diameters adjoining one another in the axial direction. The improvement is that the core body floor comprising an annular plastic web at a transition between the winding levels, which web extends radially into the winding space and in that the web has a clearance or passage to enable machine winding from the higher to the adjoining lower level.

Preferably, the web essentially corresponds in height and width to the dimensions of the winding wire. The surfaces of the cylindrical cores are preferably provided with grooves, except at the transition therebetween.

Other advantages and features of the invention will be readily apparent from the following description of the preferred embodiments, the drawings and claims.

DESCRIPTION OF THE PREFERRED EMBODIMENTS

Figure 1:
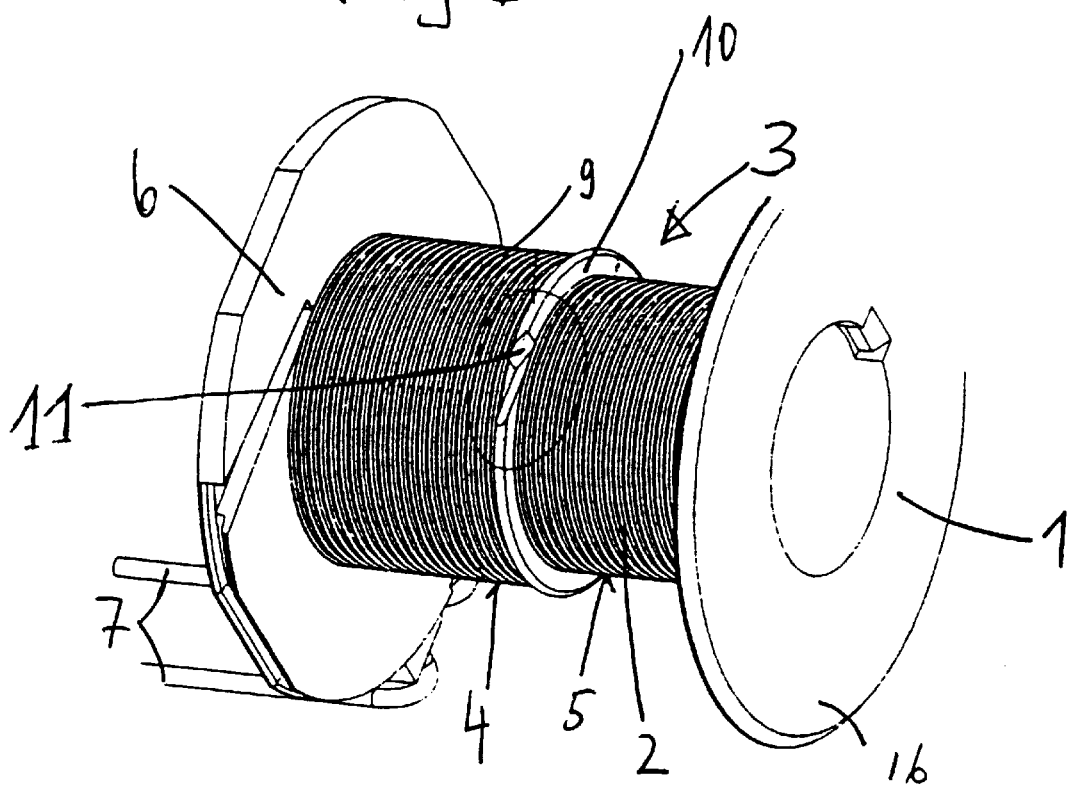
FIG. 1 is a perspective view of the coil bobbin for a magnetic coil which has not received a coil winding.

The principles of the present invention are particularly useful when incorporated in a coil body or bobbin 1 that comprises a coil core with grooves 9 that, together with radially projecting end faces or flanges 6 and 16, limit a winding space 3 provided for a winding wire 12. Two axially-extending terminal pins 7 are anchored in a region of the end face or flange 6 of the coil bobbin 1. These pins can be bent off L-shaped, whereby a short leg then forms an end region of the coil side on which the connection between the winding wire 12 and the terminal elements is to be produced by welding or soldering. Subsequently, the L-legs can be placed against the coil bobbin by being bent thereon. The coil bobbin 1 is usually extrusion coated with a plastic material after having the coil 12 wound thereon.

Figure 2:
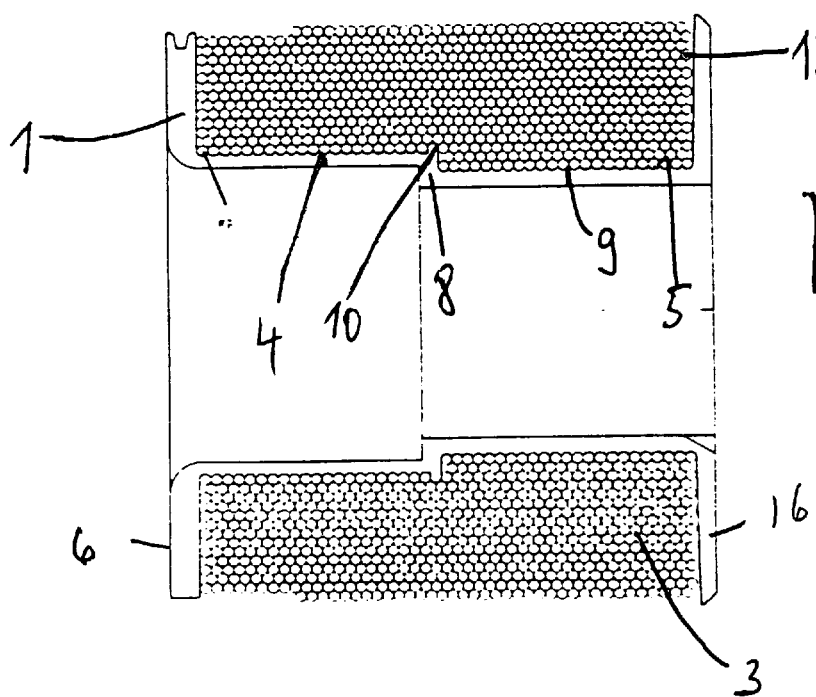
FIG. 2 is a cross sectional view of a wound coil bobbin in accordance with the present invention.

It can also be seen in FIGS. 1 and 2 that a transition 8 between the offset winding levels 4 and 5 of the two cores is provided with a plastic web 10 that remains in place between the different winding levels 4 and 5 and separates the winding wire 12 between the two levels 4 and 5. The projecting web 10 is dimensioned so that its height and width corresponds to the dimensions of the winding wire 12, whereas a clearance or passage 11 is provided in the web 10, which facilitates the automatic guidance of the wire 12 from the higher winding level 4 to the lower winding level 5 and must be kept as small as possible. As a result thereof, a uniform, undisturbed winding results, even given fully automatic winding.

The application of the grooves 9 on the surfaces of the cores forming the floor 2 assures that each turn of the winding 12 is perfectly placed next to the next turn. For the following layers of the winding, the preceding layers act as similar grooves. The outermost layer, accordingly, also exhibits this groove pattern.

As illustrated in the Figures, the web 10, in detail, prevents the winding wire 12 from sliding off in an uncontrolled fashion onto the lower level 5 at the end of the first higher winding level 4. As a result thereof, further winding can be undertaken orthocyclically, i.e., turn-by-turn without overlaps or, respectively, voids that lead to a height difference. As can be particularly seen from FIG. 2, moreover, the web 10 functions as a filling zone upon return of the winding wire 12 after it has filled the more deeply disposed level 5 and as a returning wire on what is now the same level must fill out the entire winding space 3 across the web 10. The lacquered winding wire has a typical diameter of 0.355 mm and a few hundred turns are applied at about 7000 rpm until the predetermined value of resistance is reached for the coil. As shown in FIG. 2, the web 10 has dimensions which are substantially the same as the dimension or diameter of the wire 12, so that the web fills in for one winding of the wire. In addition, as illustrated, the difference in the diameter of the body floor of the lower level 5 and the diameter of the body floor of the higher level 4 is a multiple of the diameter of the wire 12. In FIG. 2, this multiple is two times the diameter of the wire 12 so that the diameter of the third layer of the wire winding on the level 5 is the same as the diameter of the first layer on the level 4.

Although various minor modifications may be suggested by those versed in the art, it should be understood that I wish to embody within the scope of the patent granted hereon all such modifications as reasonably and properly come within the scope of my contribution to the art.

What is claimed is:

1. A magnetic coil having an essentially hollow-cylindrical coil bobbin composed of an insulating material and having two terminal pins anchored at one end region of the coil bobbin and projecting therefrom, the coil bobbin having a coil body floor forming a winding space comprising different winding levels adjoining one another in an axial direction, the improvements comprising a transition of the winding levels having a radially extending surface extending into one side of an annular plastic web at said transition, said web being radially directed into the winding space, a diameter of the body floor of the lower level and a diameter of the body floor of the upper level being different by a multiple of a diameter of the winding wire, the web having width and height dimensions essentially corresponding to the diameter of the winding wire and said web having a passage for a winding wire extending between a higher level and an adjoining lower level so that a smooth transition occurs between the first layer of the winding wire on the upper level and the adjoining layer on the lower level.

2. A magnetic coil according to claim 1, wherein the coil body is provided with grooves for the winding wire, except at the transition.

3. A magnetic coil according to claim 1, wherein the multiple is two.

* * * * *